May 2, 1939. D. PELLEGRINI Re. 21,069

DENTURE CLEANING DEVICE

Original Filed March 13, 1936

INVENTOR.
Domenick Pellegrini,
BY
Christian R. Nielsen
ATTORNEY

Reissued May 2, 1939

Re. 21,069

UNITED STATES PATENT OFFICE 21,069

DENTURE CLEANING DEVICE

Domenick Pellegrini, New York, N. Y.

Original No. 2,102,643, dated December 21, 1937, Serial No. 68,739, March 13, 1936. Application for reissue January 10, 1938, Serial No. 184,345

5 Claims. (Cl. 15—104)

This invention relates to new and useful improvements in means for cleaning dentures.

The principal object of the present invention is to provide a denture cleaning device in the form of a receptacle having a resilient lining in which dentures can be placed and thoroughly cleaned and polished by shaking the container so that cleaning pellets located in the container with the denture will coact with the lining in a manner to remove all foreign matter adhering to the denture.

Another important object of the invention is to provide a denture cleaner in which the denture can be placed and agitated along with suitable cleaning pellets without likelihood of breaking the denture.

Still another important object of the invention is to provide a denture cleaning device which will be of neat appearance and which is preferably opaque so that the denture cannot be seen therein, thus permitting the receptacle to be employed as a storage chamber when the denture is not in use.

Figure 3:
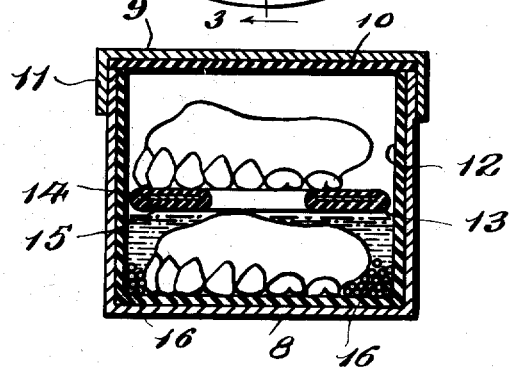
Figure 3 is a vertical sectional view taken substantially on line 3—3 of Figure 2 with the cover applied.

Referring to the drawing wherein like numerals designate like parts, it can be seen that numeral 5 generally refers to the receptacle proper and the configuration of this receptacle is preferably such as will conform as much as practical with the shape of the denture. In other words, it is preferable that one side portion of the vertical wall as denoted by numeral 6 be flat while the remaining portion 7 is approximately semicircular. The receptacle is provided with the bottom wall 8 and has the cover 9 of the slip type. The top portion of the cap 9 is provided with a resilient liner 10 extending up to and abutting the depending perimetrical flange 11. The flange 11 snugly fits the outside of the receptacle as shown in Figure 3.

The entire inside of the receptacle proper 5 has a resilient liner 12 completely covering the walls and bottom, the side walls stopping flush with the upper edge of the receptacle 5 so as to meet the liner 10 of the cap 9. By the construction thus provided, it will be noted that the walls of the receptacle 5 abut the lining 10 of the cap, and since the liner 12 of the side walls stops flush therewith, when the receptacle and cap are grasped for agitating the receptacle, the cap will be pressed inwardly toward the receptacle, with consequent compression of the liner 10 by contact with the side walls of the receptacle. It will also be noted that the liner 12 will contact the liner 10 of the cap. Thus there is formed a dual fluid-tight seal preventing leakage of cleaning fluid from the receptacle.

The form of the invention shown in the drawing is to accommodate both upper and lower artificial teeth and to separate these two pieces of denture from each other, a spacer generally referred to by numeral 13 is employed.

This spacer consists of the plate 14 which generally conforms to the curvature of the side wall of the receptacle, and around the edges and top and bottom sides of this plate 14 is the resilient jacket 15.

It will be observed that this spacer 13 is provided with a central opening, which can be circular so that the small metallic pellets 16 can readily jar back and forth through the spacer to reach both sets of denture, when the receptacle is being agitated for the purpose of cleaning the denture. Obviously, where a single denture is to be cleaned the spacer 13 will be omitted.

In the receptacle can be placed a suitable cleaning fluid or antiseptic as seen fit.

Figure 1:
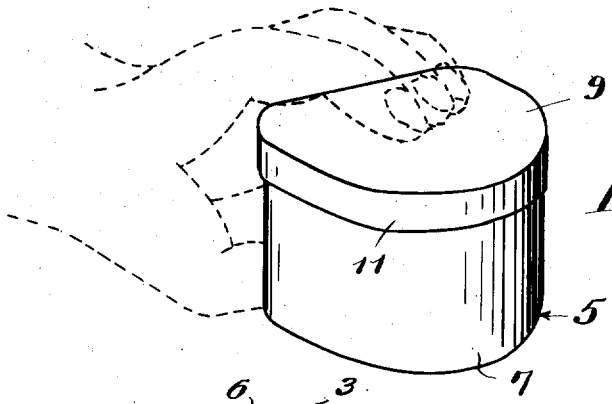
Figure 1 represents a perspective view of the device showing the same closed and further showing in broken lines how the device is held between the fingers of a hand while being shaken.
Figure 2:
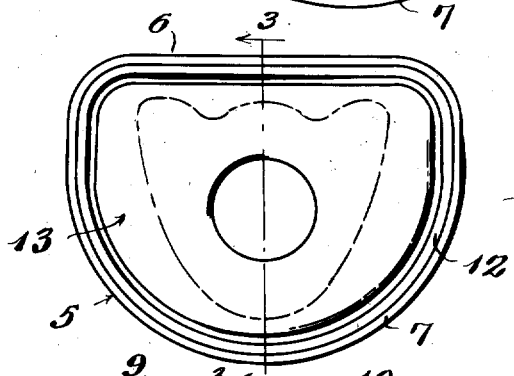
Figure 2 is a top plan view of the device with the cover removed.

The operation will be understood from the following description. The denture to be cleaned is placed in the receptacle with the pellets 16 and a suitable cleansing fluid. The cap is next placed in position upon the receptacle, the two being grasped firmly as shown in Figure 1. The receptacle is now vigorously agitated laterally and vertically, alternately, causing certain of the pellets to forcibly strike the resilient liners 10 and 12, as the case may be; other of the pellets striking the denture loosening particles therefrom. Those pellets striking the resilient linings will rebound forcibly against the denture and assist in loosening foreign material from the denture, which will be washed therefrom by the cleansing fluid. It will be apparent that the linings serve numerous functions, namely, that of providing a rebound of the pellets, lessening the amount of agitation necessary to clean the teeth, affording a fluid-tight receptacle, and acting as a buffer for the denture, as well as deadening sound during agitation of the denture, which is of importance since quite often dentures include metallic clasps, which together with the dentures themselves would create considerable noise, if they were agitated in a receptacle minus the linings. Also, it will be apparent that the linings prevent breakage or distortion of the clasps of a denture.

While I have shown and described a preferred construction, this is by way of illustration only, and I consider as my own all such modifications in structure as fairly fall within the scope of the appended claims.

I claim:

1. A denture cleaning device comprising a receptacle in which a denture can be loosely placed, a closure for the receptacle, said receptacle and closure having a substantially thick resilient lining and a multiplicity of pellets in the receptacle for direct abrasive contact with the denture upon agitation of the receptacle, certain of said pellets having forcible contact with the linings whereby to provide rebound of the pellets.

2. A denture cleaning device comprising a receptacle in which pieces of denture can be placed, a closure for the receptacle and a multiplicity of small pellets in the receptacle for abrasive contact with pieces of denture in the receptacle when said receptacle is agitated, and a perforated spacer member freely positioned in the receptacle for spacing pieces of denture in the receptacle, said spacing member having an opening to permit passage of the pellets to opposite sides thereof.

3. A denture cleaning device comprising a receptacle in which pieces of denture can be placed, a closure for the receptacle and a multiplicity of small pellets in the receptacle for abrasive contact with pieces of denture in the receptacle when said receptacle is agitated, a perforated spacer freely positioned in the receptacle for spacing pieces of denture in the receptacle, and a resilient jacket for the said spacer.

4. A denture cleaning device comprising a receptacle in which a denture can be loosely placed, a closure for the receptacle, said receptacle having a resilient lining, the lining stopping flush with the upper edges of the receptacle, said closure having a resilient lining overlying the upper edges of the receptacle whereby to form a liquid-tight seal upon application of compressive force between the receptacle and closure, and a multiplicity of pellets in the receptacle for direct abrasive contact with a denture upon agitation of the receptacle, certain of said pellets having forcible contact with the linings whereby to provide rebound of the pellets.

5. A denture cleaning device comprising a receptacle in which a denture can be loosely placed having a bottom and vertical walls, a resilient lining fixed to the bottom and vertical walls, said lining stopping flush with the upper edge of the vertical walls; a closure for the receptacle comprising a flange adapted to engage the vertical walls of the receptacle and said closure having a resilient liner of a size overlapping the vertical walls of the receptacle, whereby to form a liquid-tight seal upon application of manual pressure to the receptacle and closure, and a multiplicity of pellets and a cleaning fluid confined within the receptacle.

DOMENICK PELLEGRINI.